INVENTOR
RICHARD P. WITT
BY Herbert W. Arnold
ATTORNEY

3,309,508
HYBRID MULTIPLIER
Richard P. Witt, Framingham, Mass., assignor to Raytheon Company, Lexington, Mass., a corporation of Delaware
Filed Mar. 1, 1963, Ser. No. 262,059
4 Claims. (Cl. 235—150.52)

The present invention relates to a multiplier system, and more particularly, to a system for providing a signal representative of the product of either two analog quantities or a digital quantity and an analog quantity.

Two general systems of computation, particularly suitable for machine computers, are widely used at the present time. The first of these is a digital system wherein quantities are represented by discreet numbers and operated on with logical operations to obtain answers. In this system any desired degree of accuracy can be obtained simply by carrying out the required operations with the necessary number of digits. The disadvantage of this system, however, is the necessity of programming, that is of representing each quantity to be operated on by a series or sequence of digits and of planning the step by step operations to be performed on these digits.

The second widely used system of computation, the analog, operates directly on quantities without first converting them into numbers and is, therefore, able to bypass entirely the programming step required in digital systems. An illustration of such a device is a slide rule which multiplies quantities by adding together scaler values related to the quantities. With the development of high speed measuring equipment, the need for high speed computers has become increasingly urgent and because analog computers can be made to operate at high speed they are well suited for applications where speed is important. However, to utilize most fully this advantage of an analog computer, a continuous multiplying device is required wherein two or more quantities to be multiplied can be supplied to the device in the form of measurable physical variables, for example, such as temperature or pressure, and the resulting quantity which should be proportional to the mathematic product of the supplied quantities can be derived from the device in the form a physical variable. The physical variables involved will herein be represented by electrical signals.

It is generally recognized that, whereas the operations of adding, substracting, mutiplying by a constant and intergating and differentiating with respect to time are now satisfactorily performed by analog computers with rather simple equipment, this has not been true in the case of multiplying together two variables.

To be most generaly useful, a multiplying device of this kind should be both accurate and fast and should have high resolution, it should be without discontinuities and, of course, it should be stable in operation.

In theory, one of the simplest of the various kinds of high speed analog multipliers is an "area type" multiplier in which the amplitude of a voltage or current square wave comprising a train of pulses at fixed repetition rates is made proportional to one quantity to be multiplied and the duration, i.e., length of the wave is made proportional to a secondary quantity to be multiplied. The magnitude of the area enclosed by this voltage or square wave is then proportional to the product of the two quantities as is the average voltage or current signal derived from it. The features of this arrangement are its simplicity and the fact that answers can be obtained relatively rapidly. However, the over-all accuracy is low because of the difficulty of generating a sufficiently square "square wave" and of keeping it square, especially when operated at high speed. Various attempts to improve its accuracy have been made in the past but, so far as is known, these have failed to provide a multiplier which is also fast, simple and inexpensive. For this reason, other more complex analog multipliers have been devised and are used instead.

One popular kind of "non-area type" of multiplier is that which utilizes the "quarer square difference" principle, i.e., illustrated by the expression:

$$\frac{(a+b)^2-(a-b)^2}{4}=ab$$

Such a multiplier is dissclosed in United States Patent No. 2,674,409 to Lakatos. The accuracy of this system depends upon, among other things, the fidelity and similarity of the squaring circuits used, and upon the stability of the adding and subtracting circuits. More importantly, large fractional errors are involved in taking the difference between nearly equal quantities and accordingly, the accuracy of the system falls off when one of the input quantities approaches zero. A wide gap remains, therefore, between multipliers which are fast, simple and easy to use and those which are accurate but expensive and in the case of digital multipliers requiring programming are relatively difficult to use. The present invention is directed to fill this gap by providing a weighted multiplying technique for the multiplaction of two analog quantities or a digital quantity and an analog quantity.

It is accordingly an object of this invention to provide a new and improved multiplier which is capable of continuously multiplying two analog quantities or an analog and a digital quantity.

In accordance with this invention, a device for multiplying two analog quantities is provided wherein an analog signal is applied to a weighted impedance network in accordance with the magnitude of another analog signal to provide an output signal representative of the product of the two analog signals. In particular, an analog to digital converter operates on a first continuously varying analog signal to furnish a digital word having a plurality of bits representative of the magnitude of the first analog signal. These bits are applied to a plurality of switches, preferably of the electronic type, one of said plurality of switches being coupled to and controlled by each bit output from the analog to digital converter. Additionally, a second continuously varying analog signal is transmitted to each of the electronic switches which act as gates in response to the individual bits of the digital signal representative of the magnitude of the first analog signal to selectively gate the second signal through a plurality of weighted impedances. Thus, a weighted impedance, attenuator, or resistor is coupled to each of the electronic switches in order to provide a signal which is proportional and representative of a product of the first and second analog signals. The technique particularly teaches the weighting of each of the resistors in value inversely proportional to the weighting due to the bit position of the digital word provided by the analog to digital converter or a equivalent digital buffer. Additionally, the device can be used to directly multiply an analog to digital quantity.

For a better understanding of the present invention, together with other and further objectives of, reference is had to the following description taken in connection with the accompanying drawing and its scope will be pointed out in the appended claims. Other objectives and advantages will become apparent from the following description taken in connection with the accompanying drawing wherein:

Figure 1:
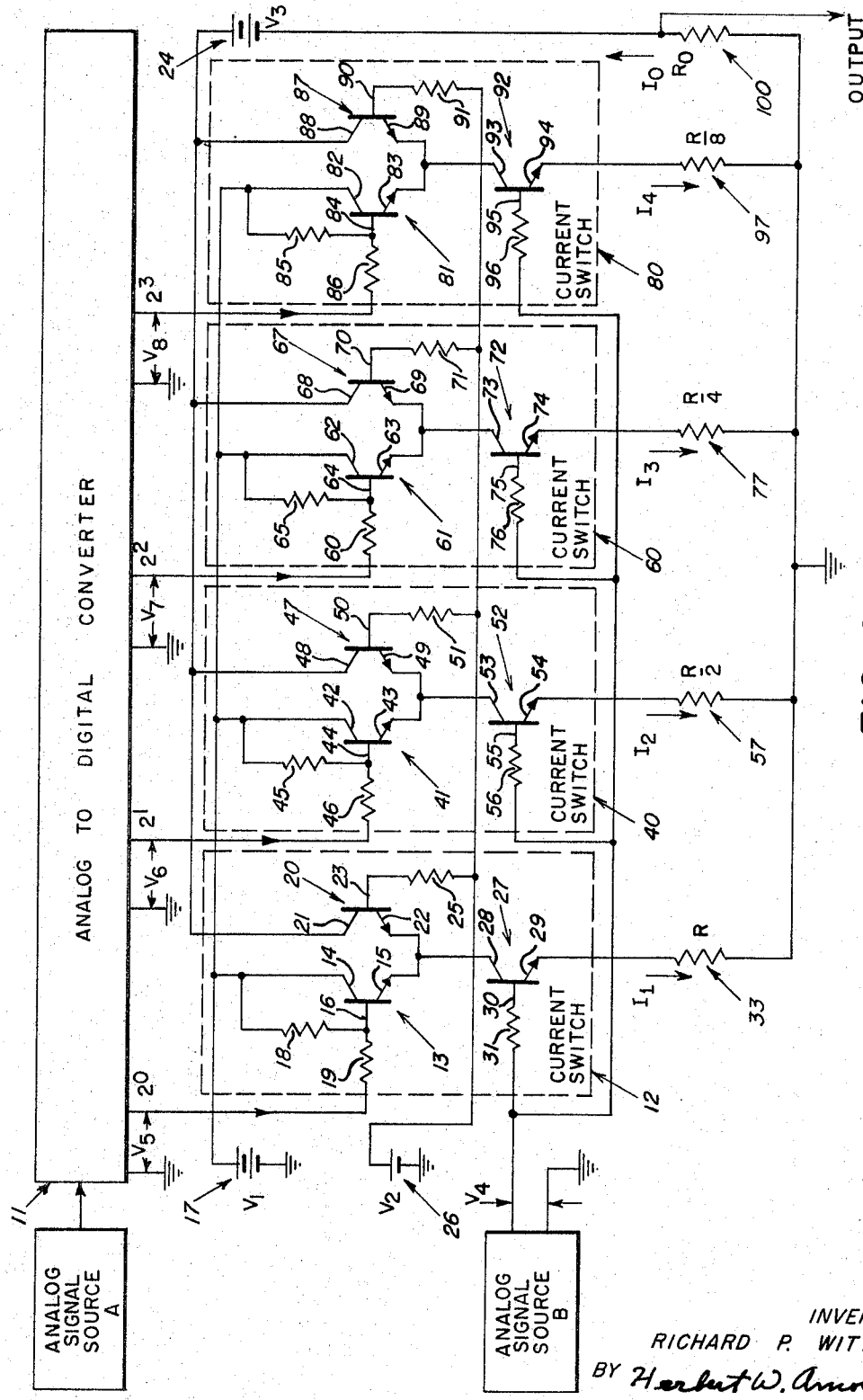
FIG. 1 is a schematic diagram of a multiplier device, including two analog input signals and an output load, which shows the multiplying technique embodying the invention.

Referring to FIG. 1, there is shown a first analog signal, such as source A, for supplying a first analog input signal, i.e., such as a physical quantity representing pressure, temperature, etc., to an analog to digital converter 11 for operating on this signal to provide an output parallel bit digital word. The particular analog digital converter shown in FIG. 1 provides a parallel output four *bit* digital word or number. The first bit represents the number $2^0$, the second bit represents the number $2^1$, the third bit represents the number $2^2$, and the fourth bit represents the number $2^3$. As herein employed, the term "bit" refers to a binary signal, either a "one" or a "zero" in the digital number or word. The analog digital converter as shown in FIG. 1 could be of the type disclosed in the publication "Notes on Analog-Digital Techniques," edited by Susskind from the M.I.T. Servomechanisms Laboratory, published in 1957 by the Technology Press and found in Chapter 5 on pages 5–54—5–62. A first current switch 12 is shown for switching current through an output load in circuit with a weighted resistance. Current switch 12 operates in response to a signal provided by the analog to digital converter 11. Switch 12 includes a first NPN transistor 13 having a collector 14, an emitter 15 and a base 16. The collector 14 is shown connected to a voltage source 17. Voltage source 17 is labeled as $V_1$. Additionally, the base 16 is connected through a biasing resistor 18 to the voltage source 17 and is connected through an input resistor 19 to the $2^0$ output line of the analog digital converter 11. The $2^0$ line provides an output voltage which is labeled as $V_5$. There is also shown a second NPN transistor 20 of switch 12 having a collector 21, an emitter 22 and a base 23. The collector 21 is shown connected to a voltage source 24. Voltage source 24 is labeled as providing a voltage $V_3$. The emitter 22 is connected to the emitter 15 of transistor 13. Thus, current switch 12 includes a comparator comprising transistors 13 and 20. The base 23 of transistor 20 is connected through a biasing resistor 25 to a voltage source 26. Voltage source 26 is labeled as providing a voltage $V_2$. Additionally, there is shown a third transistor 27 of the NPN type having a collector 28, an emitter 29 and a base 30. The base 30 is connected through an input resistor 31 to an analog signal source B which provides the second analog quantity, such as temperature or pressure, which is to be multiplied by the first analog quantity provided by signal source A. Analog signal B is labeled as providing a voltage $V_4$. The collector 28 is connected to the junction of emitters 15 and 22 of transistors 13 and 20, respectively. Additionally, there is shown a weighted resistor 33 connected to emitter 29 at one end and at ground at its other end. In this instance, resistor 33 is designated as R, and is inversely proportional to the $2^0$ output of the digital word, inasmuch as it is connected to switch 12 which is connected to the $2^0$ output line of the analog digital converter 11.

A second current switch 40 is shown having a first NPN transistor 41 with a collector 42, an emitter 43 and a base 44. The base 44 is connected through a biasing resistor 45 to the voltage source 17 and is also connected through an input resistor 46 to the $2^1$ output line of analog digital converter 11. The $2^1$ line provides an output voltage which is labeled as $V_6$. Collector 42 of transistor 41 is shown connected to the voltage source 17. Additionally, there is shown a second NPN transistor 47 having a collector 48, an emitter 49 and a base 50. Emitter 49 is connected to the emitter 43 of transistor 41 and the collector 48 is connected to the voltage source 24. Hence, current switch 40 includes a comparator comprising transistors 41 and 47. The base 50 is connected through a biasing resistor 51 to voltage source 26. Furthermore, there is shown a third NPN transistor 52 having a collector 53, an emitter 54 and a base 55, collector 53 being connected to the junction of emitters 43 and 49 of transistors 41 and 47, respectively. Base 55 is connected through an input resistor 56 to the analog signal source B. Additionally, there is shown a weighted resistor 57 which is connected to the emitter 54 of transistor 52 at one end and at its other end to ground. The resistor 57, in this instance, is weighted in value equal to $R/2$ and is inversely proportional to the $2^1$ bit output of the digital word, inasmuch as it is connected through switch 40 to the $2^1$ output of analog to digital converter 11.

A third current switch 60 is shown having a first NPN transistor 61 with a collector 62, an emitter 63 and a base 64. The base 64 is connected through an input resistor 66 to the $2^2$ output line of analog digital converter 11. The $2^2$ line provides an output voltage which is labeled as $V_7$. Additionally, base 64 is connected through a biasing resistor 65 to voltage source 17. The collector 62 of transistor 61 is also connected to the voltage source 17. A second NPN transistor 67 is shown having a collector 68, an emitter 69 and a base 70. The collector 68 is shown connected to voltage source 24, and the base 70 is shown connected through a biasing resistor 71 to the voltage source 26. Additionally, emitter 69 is shown connected to emitter 63 of transistor 61. Accordingly, current switch 60 includes a comparator comprising transistors 61 and 67. There is also shown a third NPN transistor 72 having a collector 73, an emitter 74 and a base 75. Collector 73 is shown connected to the junction of emitters 63 and 69 of transistors 61 and 67, respectively. Base 75 is shown connected through an input resistor 76 to analog signal source B. There is also shown a weighted resistor 77 which is connected at one end to emitter 74 of transistor 72 and at its other end to ground. The resistor 77 in this instance is weighted in value equal to $R/4$ and is inversely proportional to the $2^2$ bit output of the digital word since it is connected to the $2^2$ bit output of analog digital converter 11.

A fourth current switch 80 is shown having a first NPN transistor 81. Transistor 81 has a collector 82, an emitter 83 and a base 84. The base 84 is shown connected through an input resistor 86 to the $2^3$ output bit line of analog digital converter 11. The $2^3$ line provides an output voltage which is labeled as $V_8$. Additionally, collector 82 is shown connected to voltage source 17 and base 84 is shown coupled through a biasing resistor 85 to voltage source 17. A second NPN transistor 87 is shown having a collector 88, an emitter 89 and a base 90. Collector 88 is shown connected to voltage source 24, and emitter 89 is shown coupled to emitter 83 of transistor 81. Thus, current switch 80 includes a comparator comprising transistors 81 and 87. Additionally, there is shown base 90 coupled through a biasing resistor 91 to voltage source 26. A third NPN transistor 92 is shown having a collector 93, an emitter 94 and a base 95. Collector 93 is shown coupled to the junction of emitters 83 and 89 of transistors 81 and 87, respectively. Base 95 is shown coupled through an input resistor 96 to analog signal source B. Additionally, there is shown a weighted resistor 97 which is connected to emitter 94 of transistor 92 at one end and at its other end to ground. The resistor 97, in this instance, is weighted in value equal to $R/8$ inasmuch as it is to represent one-eighth of the resistive value of resistor 33 since it is connected to the $2^3$ output of analog digital converter 11. Additionally, there is shown an output signal load resistor 100, coupled at one end to voltage source 24 and at its other end to ground.

Referring to FIG. 1, the analog to digital converter 11 provides a positive signal representative of the one state, and a more positive signal which is representative of the binary zero state; for example, in this embodiment the one state on lines $2^0$, $2^1$, $2^2$, and $2^3$ is represented on these lines by, for example, plus 6 volts. Thus, a signal is provided to gate current through one of two different paths of current switches 12, 40, 60 and 80, one of said current paths including a weighting resistor and an output load impedance.

The following restraints are placed on the voltages which have been designated as $V_1$, $V_2$ and $V_3$ with respect to the two output voltage levels representing a one or a zero which are provided by the analog to digital converter to operate the current switches so as to provide a weighted current output representative of the multiplication of two positive going analog signals from analog sources A and B. For example, $V_1$, $V_2$ and $V_3$ are adjusted so that $V_1 > V_2$; $V_1 > V_5$, $V_6$, $V_7$ and $V_8$; $V_3 > V_2$; $V_3 > V_5$, $V_6$, $V_7$ and $V_8$; and $V_4$ is a positive going voltage.

$V_5 < V_2$ when analog signal A is positive and equal to the following predetermined magnitudes, 1, 3, 5, 7, 9, 11, 13, 15, otherwise $V_5 > V_2$;

$V_6 < V_2$ when analog signal A is positive and equal to the following predetermined magnitudes 2, 3, 6, 7, 10, 11, 14, 15, otherwise $V_6 > V_2$;

$V_7 < V_2$ when analog signal A is positive and equal to the following predetermined magnitudes, 4, 5, 6, 7, 12, 13, 15, otherwise $V_7 > V_2$;

$V_8 < V_2$ when analog signal A is positive and equal to the following predetermined magnitudes, 8, 9, 10, 11, 12, 13, 14, 15, otherwise $V_8 > V_2$; and $V_4$ varies in voltage between predetermined magnitudes representing positive values $0 < V_4 \leqq 15$.

Now considering the operation of the multiplier system and referring to FIG. 1 in the absence of a signal from analog signal source A and in the presence of a positive polarity analog signal from analog source B, transistors 20, 47, 67 and 87 of current switches 12, 40, 60 and 80, respectively, will be nonconducting due to the reverse biasing of transistor bases 23, 50, 70 and 90, respectively. Transistors 13, 41, 61 and 91 of switches 12, 40, 60 and 80, respectively, will be conducting due to forward biasing of their respective bases. The forward biasing of bases 16, 44, 64 and 84 of transistors 13, 41, 61 and 81, respectively, is provided by the summation of the biasing currents provided by the voltage source $V_1$ and the voltage $V_5$ applied to transistor 13, the voltages $V_1$ and $V_6$ applied to transistor 41, the voltages $V_1$ and $V_7$ applied to transistor 61 and the voltages $V_1$ and $V_8$ applied to transistor 81. Transistors 27, 52, 72 and 92 will also be conducting due to the biasing of their respective bases 30, 55, 75 and 95 by a biasing current provided to each of these transistors by the positive analog signal source B ($V_4$). Currents $I_1$, $I_2$, $I_3$ and $I_4$ will then flow through a circuit path comprising voltage source 17, transistors 13 and 27 of current switch 12, transistors 42 and 52 of current switch 40, transistors 61 and 72 of current switch 60, transistors 81 and 92 of current switch 80, and thus there will be no current $I_0$ flowing through output load resistor 100.

Now for purposes of explanation assume that analog signal source B is continually providing a positive voltage signal of a magnitude of "1" unit and analog signal source A is also providing a positive signal which is sampled by analog to digital converter 11. Assume that the magnitude of signal A is in the order of 1 unit and therefore will be converted by the analog to digital converter 11 into a parallel digital signal word which is represented by a binary bit "one" on the $2^0$ output line. The analog to digital converter 11 provides a signal output to represent this "one" condition of its output line $2^0$ and, therefore in this case, line $2^0$ will as seen be at a potential $< V_2$ and the remainder of the lines $2^1$, $2^2$, and $2^3$ will continue to be at a potential $> V_2$ and therefore will not effect the operation of the system. This signal on the $2^0$ line is transmitted through input resistor 19 to base 16 of transistor 13. The magnitude of this signal being less positive than $V_2$ causes transistor 13 to turn "off" or nonconduct. The turning off of transistor 13 causes the junction of emitters 15 and 22 of switch 12 to become less positive than the positive potential that is applied to base 23 of transistor 20 by the biasing current applied through biasing resistor 25 coupled to voltage source 26. Due to emitter 22 becoming less positive than base 23 of transistor 20, transistor 20 becomes conducting. This then provides a current $I_1$ which flows through weighted resistor 33 and a current $I_0$ which flows through $R_0$ or load resistor 100, $I_0$ in this instance being equal to $I_1$. Therefore, the current $I_1$ is proportional to the amplitude of the analog signal B represented by the voltage $V_4$ and is multiplied by the weighting of resistor 33 to produce an output signal which is the multiple of the two analog quantities from signal sources A and B. It is thus seen that the application of the signal on line $2^0$ causing transistor 20 to conduct and in effect gate an analog signal from source B through weighted resistor R and load resistor $R_0$, thus provides a signal which is the multiple of the two analog quantities.

Furthermore, for purposes of explanation, assume that analog signal generator B continues to provide a positive analog signal and that analog signal generator A now provides an analog signal in the order of magnitude of 15 units. Analog to digital converter 11 will then convert this signal from generator A into voltage signal outputs $V_5$, $V_6$, $V_7$ and $V_8$ each less than $V_2$ on output lines $2^0$, $2^1$, $2^2$ and $2^3$ of analog to digital converter 11. These signals applied to the bases 13, 44, 64 and 84 of transistors 13, 41, 61 and 81, respectively, will cause these transistors to turn "off" or nonconduct. The turning off of these transistors will produce a change of bias which will be applied to the emitters 22, 49, 69 and 89 of transistors 20, 47, 67 and 87, respectively, to turn on these transistors. A current will then flow through output resistor 100 and can be represented by:

$I_0 = I_1 + I_2 + I_3 + I_4$ where $I_0$ = the output current representative of the multiplication of analog signals from analog signal generators A and B; and $I_1$, $I_2$, $I_3$ and $I_4$ represent the currents flowing through resistors 33, 57, 77 and 97, respectively.

Furthermore, it should be noted from the above that since $$I_0 \approx \frac{V_1}{R/8} + \frac{V_1}{R/4} + \frac{V_1}{R/2} + V_1/R$$

where $V_1$ is the magnitude of the voltage source 17 and R, $R/2$, $R/4$ and $R/8$ represents the weighted resistors 33, 57, 77 and 97, which are weighted inversely proportional to the magnitude of the bit position of the digital word to which their respective switch is coupled. The signal $I_0$ will then be a true representation of the multiplication of analog signals A and B, whereby a current directly related to the products of the two signals is obtained. Thus, a multiplier is provided which is fast, simple, and easy to use, but which is inexpensive in comparison to the other techniques available.

Additionally, it is to be noted that the weighted resistors R, $R/2$, $R/4$ and $R/8$ provide a weighted attenuation network, each of these resistors in ascending order being related to its adjacent resistance by an arithmetic multiple and, more particularly in this embodiment, by a factor of one-half.

Figure 2:
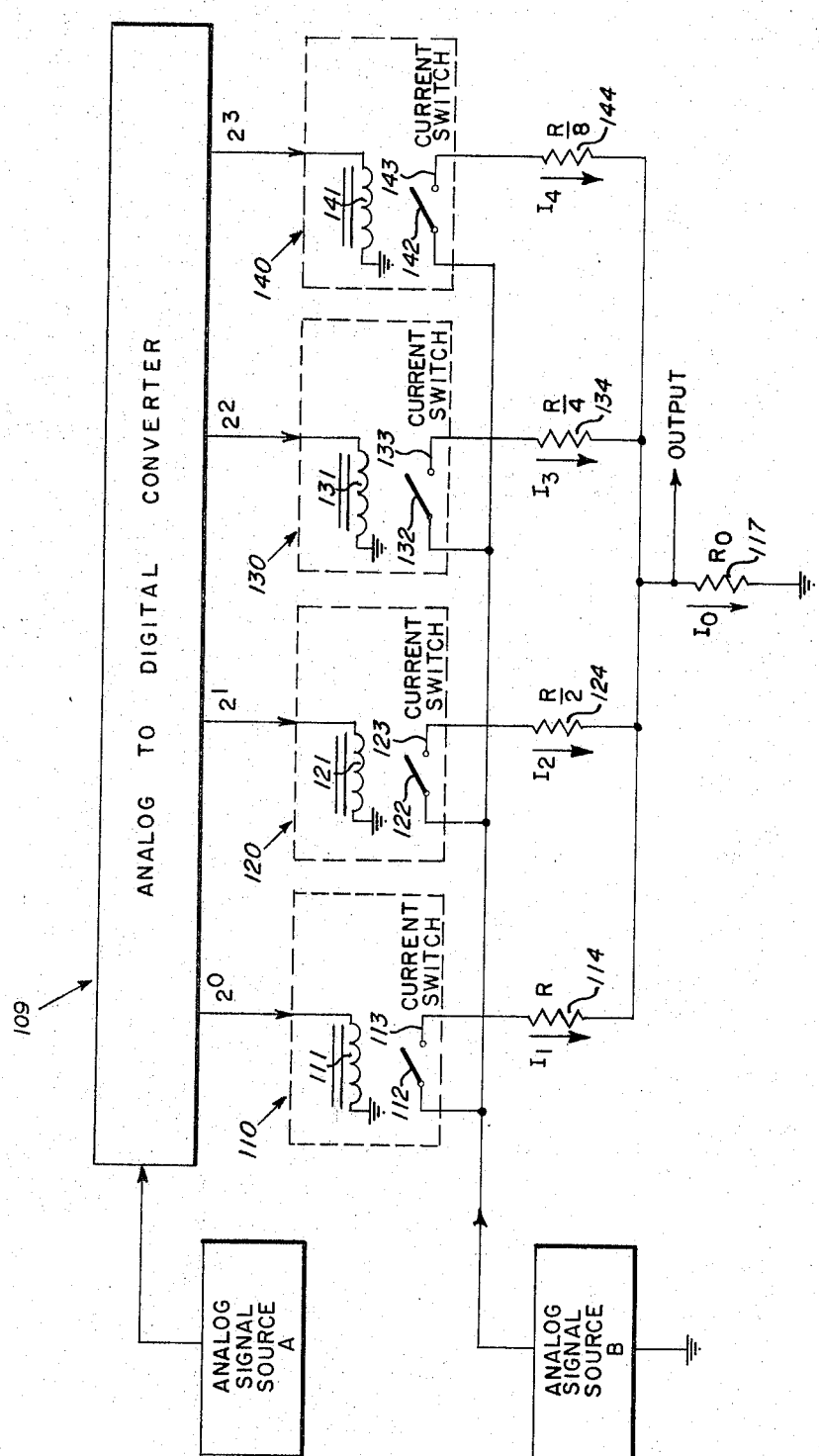
FIG. 2 is another embodiment of a multiplier device in schematic form according to the invention.

Referring now to FIG. 2, there is shown another embodiment of the multiplier in schematic form according to the invention. An analog signal source A is shown for providing a first analog signal to an analog to digital converter 109. This particular analog to digital converter shown in FIG. 2 provides a parallel output four bit digital word or number. The first bit represents the number $2^0$, the second bit represents the number $2^1$, the third bit represents the number $2^2$ and the fourth bit represents the number $2^3$. As herein employed, the term "bit" refers to a binary signal with a "1" or a "0" in the digital number or word, a "1" being representative of a positive voltage output and an "0" being representative of no voltage output.

A first relay current switch 110 is shown with a relay coil 111 connected to the $2^0$ output line of analog to digital converter 109 at one end and at its other end to ground. A switch 112 is shown connected to an analog signal source B. A switch contact 113 of current switch 110 is shown connected to a resistor 114 at one end. Resistor 114 is connected through a load resistor 117 to ground. In this particular embodiment the resistance of resistor 117 is « than resistor 114.

A second relay current switch 120 is shown having an energized relay coil 121 connected between ground and the $2^1$ output line of analog to digital converter 11. A movable switch 122 is shown connected to analog signal source B and a contact 123 having a switch 122 is shown connected through a resistor 124. Resistor 124 is weighted in value inversely proportional to the particular position to which current switch 120 is connected. In this particular instance, since current relay switch 120 is connected to the $2^1$, line resistor 124 is weighted equal to $R/2^1$ or $R/2$. Resistor 124 is shown connected at its other end to an output load resistor 117.

A third relay current switch 130 is shown having a relay energizing coil 131 connected to the $2^2$ output line of analog to digital converter 109. Switch 132 is shown connected to analog signal source B, and a switch contact 133 is shown connected through a weighted resistor 134 to load resistor 117. Resistor 134 is in this instance weighted and equal to $R/2^2$ or $R/4$ inasmuch as current switch 130 is connected to the $2^2$ output line of analog to digital converter 109.

A fourth relay current switch 140 is shown having a relay energizing coil 141 connected to the $2^3$ of the output line of analog to digital converter 109. A relay switch 142 is shown coupled to analog signal source B and a relay switch contact 143 is shown connected through a weighted resistor 144 to an output load resistor 117. Resistor 144 is in this instance weighted in value equal to $R/2^3$ or $R/8$ inasmuch as the current switch 140 to which it is coupled to is connected to the $2^3$ output line of analog to digital converter 109.

Considering the operation of the multiplier system of FIG. 2 in the absence of an analog signal from analog source A, analog signal converter 109 will have an "0" signal output on its output lines $2^0$, $2^1$, $2^2$, and $2^3$. Therefore, relay switches 102, 112, 122, 132 and 142 will be in the "open" condition and therefore, $I_0$ which is equal to $I_1+I_2+I_3+I_4$ is equal to 0. Assuming now that analog signal source B is providing a signal of an arbitrary magnitude equal to 10 units and also assuming that analog signal source A is providing a signal of a magnitude equal to 15 units. Therefore, analog to digital converted 109 would according to the binary system provide energizing signal outputs on its $2^0$, $2^1$, $2^2$, and $2^3$ output lines. Of course, an additional current switch and resistance would provide up to a magnitude of 31 units. These outputs will pass a current through relay coils 111, 121, 131 and 141 and close relay switches 112 to contact 113, relay switch 122 to relay contact 123, relay switch 132 to relay contact 133 and relay switch 142 to relay contact 143. Therefore, a current $I_1$ will flow through resistor 114 equal in magnitude to $10/R$, a current $I_2$ will flow through resistor 124 equal to $$\frac{10}{R/2}$$

and the current $I_3$ will flow through resistor 134 equal to $$\frac{10}{R/4}$$

and the current $I_4$ will flow through resistor 144 equal to $$\frac{10}{R/8}$$

Therefore, a combined current $I_0$ equal to $I_1+I_2+I_3+I_4$ will flow through the output load resistor 117. $I_0$ will then be a true representation of a current which is proportional and directly related to and is, in fact, a multiplication of analog signals A and B.

This completes the description of the preferred embodiments of the invention, however, many modifications of the invention will be apparent to persons skilled in the art. For example, PNP's transistors, controlled rectifiers, tubes or other types of switching devices could be used to implement such a technique as disclosed by the invention. Additionally, if it were desirable to produce a frequency rather than a current as shown in the preferred embodiments, other weighting devices such as LC networks could be utilized to produce weighted frequency or weighted phase difference output signals. Accordingly, it is desired that this invention not be limited except as defined by the appended claims.

What is claimed is:

1. A multiplier for generating a signal representative of the product of a digital quantity and an analog quantity comprising a source of reference potential, a source of ground potential, a plurality of switching devices each having a transistor having base, collector, and emitter electrodes, a first input circuit for said analog quantity connected to said base electrode, a comparator connected to said reference potential source and to said collector electrode, and a second input circuit for a digit of said digital quantity connected to said comparator, means for providing a signal whose magnitude varies as a function of said analog quantity to each of said first input circuits, means for providing a different digit of said digital quantity to each of said second input circuits, and means for providing an output signal proportional to the product of said analog and digital signal including a plurality of weighted impedances, one of said impedances coupled to each emitter electrode of each one of said plurality of switching devices and to said source of ground potential, and each of said impedances being weighted in value inversely proportional to the weighting of the digit which is applied to the switch to which it is coupled, a summing impedance means connected between said source of reference potential and said source of ground potential, and output signal transfer means connected to said source of reference potential and to said summing means.

2. In a multiplier for generating a signal representative of the product of a digital quantity and an analog quantity including a first, second, and third source of reference potential, a plurality of switching devices each having a first input circuit for receiving said analog quantity and a second input circuit for receiving a digit of said digital quantity, means for providing a signal whose magnitude varies as a function of said analog quantity to said first input circuit, means for providing a different digit of said digital quantity to each one of said second input circuits, and means for providing an output signal which is proportional to the product of said analog and digital signals including a plurality of weighted impedances, one of said impedances coupled to each one of said plurality of switching devices, each of said impedances being weighted in value inversely proportional to the weighting of the digit which is applied to the switch to which it is coupled, and said impedances being a multiple of each adjacent impedance; each of said switching devices comprising first, second, and third transistors each including base, collector, and emitter electrodes; the emitter electrodes of said first and second transistors being connected in common to the collector electrode of said third transistor; said first input circuit being connected to the base electrode of said third transistor; said second input circuit being connected to the base electrode of said first transistor; said first source being connected to the collector of said first transistor; said second source being connected to the base of said second transistor; said third source being connected to the collector of said second transistor; and, one of said impedances being coupled to each emitter of the third transistor of each one of said switching devices.

3. A multiplier for generating a signal representative of the product of first and second analog quantities comprising a source of reference potential, a source of ground potential, an analog to digital conversion device, means for applying said first analog signal to said analog to digital conversion device, said conversion device providing a digital quantity having a plurality of digits representative of the magnitude of said first analog quantity, each of said digits being weighted in position in ascending order, a plurality of switching devices each having a transistor having base, collector, and emitter electrodes, a first input circuit for receiving said second analog quantity connected to said base electrode, a comparator connected to said reference potential source and to said collector electrode, and a second input circuit for receiving a digit of said digital quantity connected to said comparator, means for providing a different digit of said digital quantity to each one of said plurality of switching devices through said second input circuit, means for providing said second analog quantity to each of said first input circuits, and a plurality of weighted impedances, one of each impedances coupled to each emitter electrode of each one of said plurality of switches and to said source of ground potential, and each of said impedances weighted in ascending order in value inversely proportional to the magnitude of the digit of the digital word being applied to each of said switches, a summing impedance means connected between said source of reference potential and said source of ground potential, and output signal transfer means connected to said source of reference potential and to said summing means.

4. In a multiplier including first, second, and third sources of reference potential, an analog to digital conversion device, means for applying a first analog signal to said analog to digital conversion device said analog to digital conversion device providing a digital quantity having a plurality of digits representative of the magnitude of said first analog quantity, a plurality of switching devices each having a first input circuit, each of said switches also having a second input circuit for a digit of said digital quantity, means for providing a different digit of said digital quantity to each one of said plurality of switching devices through said second input circuits, means for providing a second analog quantity to each of said first input circuits, and a plurality of weighted impedances, one of each impedances coupled to each of said plurality of switches, each of said impedances weighted in ascending order in value inversely proportional to the magnitude of the digit of the digital word being applied to each of said switching devices; each of said switching devices comprising first, second, and third transistors each including base, collector, and emitter electrodes; the emitter electrodes of said first and second transistors being connected in common to the collector electrode of said third transistor; said first input circuit being connected to the base electrode of said third transistor; said second input circuit being connected to the base electrode of said first transistor; said first source being connected to the collector of said first transistor; said second source being connected to the base of said second transistor; said third source being connected to the collector of said second transistor; and, one of said impedances coupled to each emitter of the third transistor of each one of said switches.

References Cited by the Examiner

UNITED STATES PATENTS

| | | | |
|---|---|---|---|
| 2,865,565 | 12/1958 | Vance | 235—150.52 |
| 3,019,426 | 1/1962 | Gilbert | 340—347 |
| 3,106,646 | 10/1963 | Carter | 307—88.5 |
| 3,177,350 | 4/1965 | Abbott et al. | 235—159.52 X |

MALCOLM A. MORRISON, *Primary Examiner.*

K. W. DOBYNS, M. P. HARTMAN,
*Assistant Examiners.*